(12) United States Patent
Park et al.

(10) Patent No.: US 9,319,193 B2
(45) Date of Patent: Apr. 19, 2016

(54) METHOD FOR INTERFERENCE MEASUREMENT IN BASE STATION COOPERATIVE WIRELESS COMMUNICATION SYSTEM, AND DEVICE THEREFOR

(71) Applicant: LG ELECTRONICS INC., Seoul (KR)

(72) Inventors: Jonghyun Park, Anyang-si (KR); Hyungtae Kim, Anyang-si (KR); Illsoo Sohn, Anyang-si (KR); Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/377,094

(22) PCT Filed: Mar. 7, 2013

(86) PCT No.: PCT/KR2013/001851
§ 371 (c)(1),
(2) Date: Aug. 6, 2014

(87) PCT Pub. No.: WO2013/137589
PCT Pub. Date: Sep. 19, 2013

(65) Prior Publication Data
US 2015/0003368 A1 Jan. 1, 2015

Related U.S. Application Data

(60) Provisional application No. 61/609,945, filed on Mar. 13, 2012, provisional application No. 61/612,311, filed on Mar. 17, 2012, provisional application No. 61/619,404, filed on Apr. 2, 2012.

(51) Int. Cl.
*H04L 5/00* (2006.01)
*H04W 24/02* (2009.01)
*H04B 7/26* (2006.01)

(52) U.S. Cl.
CPC ............ *H04L 5/0048* (2013.01); *H04B 7/2656* (2013.01); *H04W 24/02* (2013.01)

(58) Field of Classification Search
None
See application file for complete search history.

(56) References Cited

U.S. PATENT DOCUMENTS

2013/0194931 A1* 8/2013 Lee et al. ............. 370/241
2013/0208604 A1* 8/2013 Lee et al. ............. 370/252
(Continued)

OTHER PUBLICATIONS

HTC, "A CSI-RS configuration for channel Estimation and interference measurement", 3GPP TSG-RAN WG1 #68, Agenda Item: 7.5.4.2.2, Dresden, Germany, Feb. 6-10, 2012, 3 pages, R1-120699.
(Continued)

*Primary Examiner* — Benjamin H Elliott, IV
(74) *Attorney, Agent, or Firm* — Birch, Stewart, Kolasch & Birch, LLP

(57) ABSTRACT

The present application discloses a method wherein a terminal sets an interference measurement reference signal resource in a wireless communication system. The method comprises the steps of: receiving first resource setting data, comprising bit map data indicating the position of a resource element for a reference signal in one subframe and comprising subframe data whereby the reference signal can be received; receiving second resource setting data of the interference measurement reference signal, constituted on the basis of the first resource setting data and the interference measurement reference signal resource, on the basis of the second resource setting data. The second resource setting data comprises resource element data indicating the position of one or more resource element and comprises interference measurement subframe data indicating the position of a subframe where the interference measurement reference signal can be received. The subframe indicated by the interference measurement subframe data is defined by a subset of the subframe indicated by the subframe data comprised in the first resource setting data.

14 Claims, 13 Drawing Sheets

(56) References Cited

U.S. PATENT DOCUMENTS

2014/0321313 A1* 10/2014 Seo et al. .................... 370/252
2015/0003368 A1* 1/2015 Park et al. .................... 370/329

OTHER PUBLICATIONS

Huawei et al., "Correction on CSI-RS configuration", 3GPP TSG RAN WG1 Meeting #65, Barcelona, Spain, May 9-13, 2011, 2 pages, R1-111806.

Motorola Mobility, "Interference Measurements for Release-11", 3GPP TSG RAN1 #68, Agenda Item: 7.5.2, Dresden, Germany, Feb. 6-10, 2012, 3 pages, R1-120522.

Nokia Siemens Networks, Nokia, "Interference measurement support for Rel-11", 3GPP TSG RAN WG1 Meeting #68, Agenda Item: 7.5.2, Dresden, Germany, Feb. 6-10, 2012, 4 pages, R1-120722.

QUALCOMM Incorporated, "Interference measurement in support of downlink CoMP", 3GPP TSG-RAN WG1 #68, Agenda Item: 7.5.2, Dresden, Germany, Feb. 6-10, 2012, 4 pages, R1-120548.

* cited by examiner (a) CONTROL-PLANE PROTOCOL STACK (b) USER-PLANE PROTOCOL STACK

METHOD FOR INTERFERENCE MEASUREMENT IN BASE STATION COOPERATIVE WIRELESS COMMUNICATION SYSTEM, AND DEVICE THEREFOR

CROSS REFERENCE TO RELATED APPLICATIONS

This application is the National Phase of PCT International Application No. PCT/KR2013/001851, filed on Mar. 7, 2013, which claims priority under 35 U.S.C. 119(e) to U.S. Provisional Application Nos. 61/609,945 filed on Mar. 13, 2012, 61/612,311 filed on Mar. 17, 2012, 61/619,404 filed on Apr. 2, 2012, all of which are hereby expressly incorporated by reference into the present application.

TECHNICAL FIELD

The present invention relates to a wireless communication system and, more particularly, to a method and apparatus for measuring interference in a base station cooperative wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for measuring interference in a base station cooperative wireless communication system.

Technical Solution

The object of the present invention can be achieved by providing a method for configuring resources of a reference signal for interference measurement at a user equipment (UE) in a wireless communication system including receiving first resource configuration information including bitmap information indicating a location of a resource element for a reference signal within one subframe and subframe information for reception of the reference signal; receiving second resource configuration information of the reference signal for interference measurement configured based on the first resource configuration information; and configuring the resources of the reference signal for interference measurement based on the second resource configuration information, wherein the second resource configuration information includes resource element information indicating locations of one or more resource elements and interference measurement subframe information indicating a subframe location for reception of the reference signal for interference measurement, and wherein a subframe indicated by the interference measurement subframe information is defined by a subset of subframes indicated by the subframe information included in the first resource configuration information.

The subframe information included in the first resource configuration information may include subframe periodicity and a subframe offset and the subframe measurement subframe information may be a multiple of the subframe periodicity. In this case, the subframe offset of the reference signal for interference measurement may be equal to the subframe offset of the subframe information included in the resource configuration information.

Alternatively, the subframe measurement subframe information may include a subframe offset of the reference signal for interference measurement, which is expressed as a multiple of the subframe periodicity.

Preferably, the location of a resource element indicated by the resource element information may be included in locations of resource elements indicated by the bitmap information.

The reference signal may be a zero-power channel state information reference signal (CSI-RS). The zero-power CSI-RS may be defined in four resource element units. Alternatively, the zero-power CSI-RS may be referred to as a CSI-RS which may be transmitted from one or more neighbor cells.

If the reference signal for interference measurement is defined by eight resource elements, the resource element information may include information on two bit indices set to 1 in the bitmap information. If the reference signal for interference measurement is defined by two resource elements, the resource element information may further include information indicating two resource elements among four resource elements indicated by the bitmap information.

In another aspect of the present invention, provided herein is a user equipment (UE) operating in a wireless communication system including a wireless communication module configured to receive first resource configuration information including bitmap information indicating a location of a resource element for a reference signal within one subframe and subframe information for reception of the reference signal and to receive second resource configuration information of the reference signal for interference measurement configured based on the first resource configuration information; and a processor configured to configure the resources of the reference signal for interference measurement based on the second resource configuration information, wherein the second resource configuration information includes resource element information indicating locations of one or more resource elements and interference measurement subframe information indicating a subframe location for reception of the reference signal for interference measurement, and wherein a subframe indicated by the interference measurement subframe information is defined by a subset of subframes indicated by the subframe information included in the first resource configuration information.

Advantageous Effects

According to embodiments of the present invention, in a base station cooperative wireless communication system, a user equipment (UE) can efficiently perform interference measurement using a zero-power channel state information-reference signal (CSI-RS).

It will be appreciated by persons skilled in the art that that the effects that can be achieved through the present invention are not limited to what has been particularly described hereinabove and other advantages of the present invention will be more clearly understood from the following detailed description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

Figure 1:
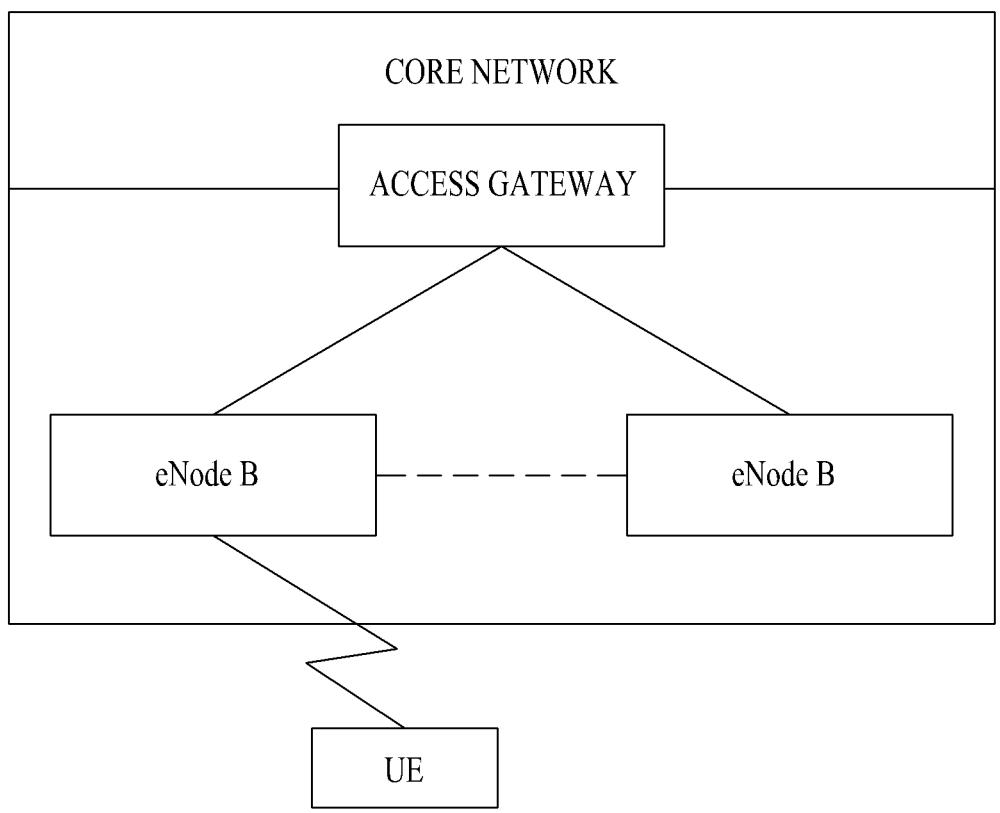
FIG. 1 is a diagram showing a network structure of an Evolved Universal Mobile Telecommunications System (E-UMTS) as an example of a wireless communication system.
Figure 2:
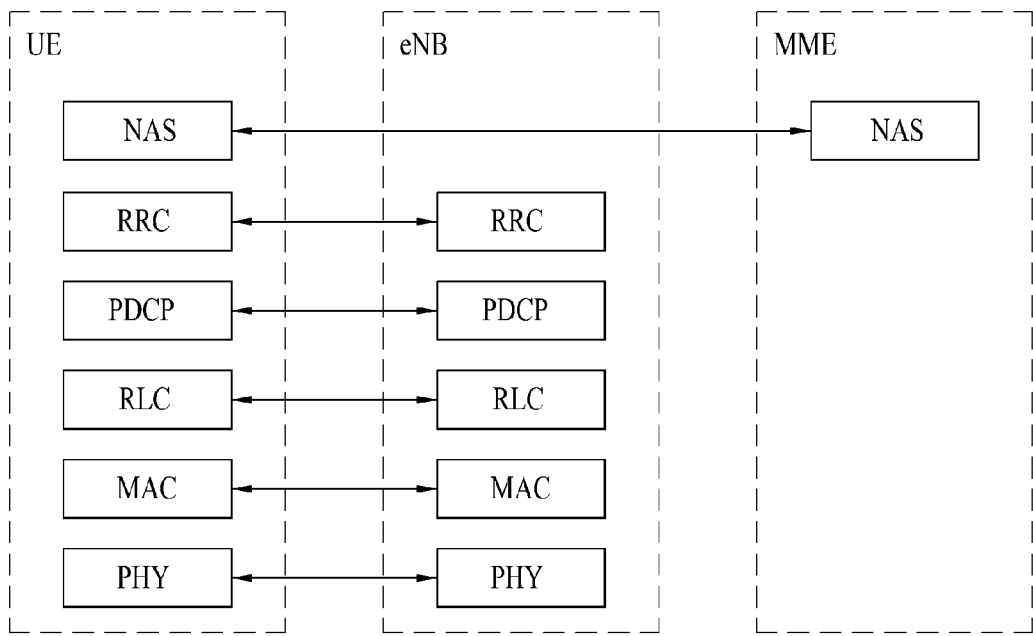
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
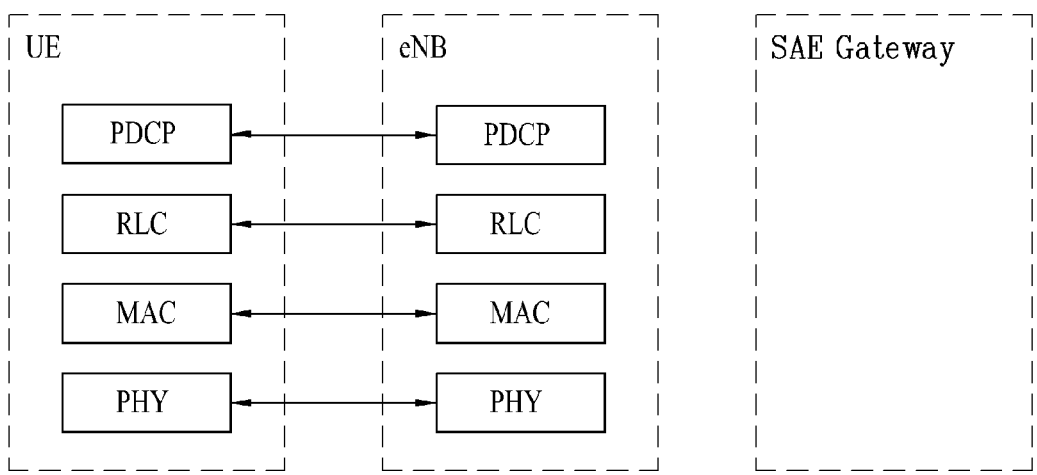

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
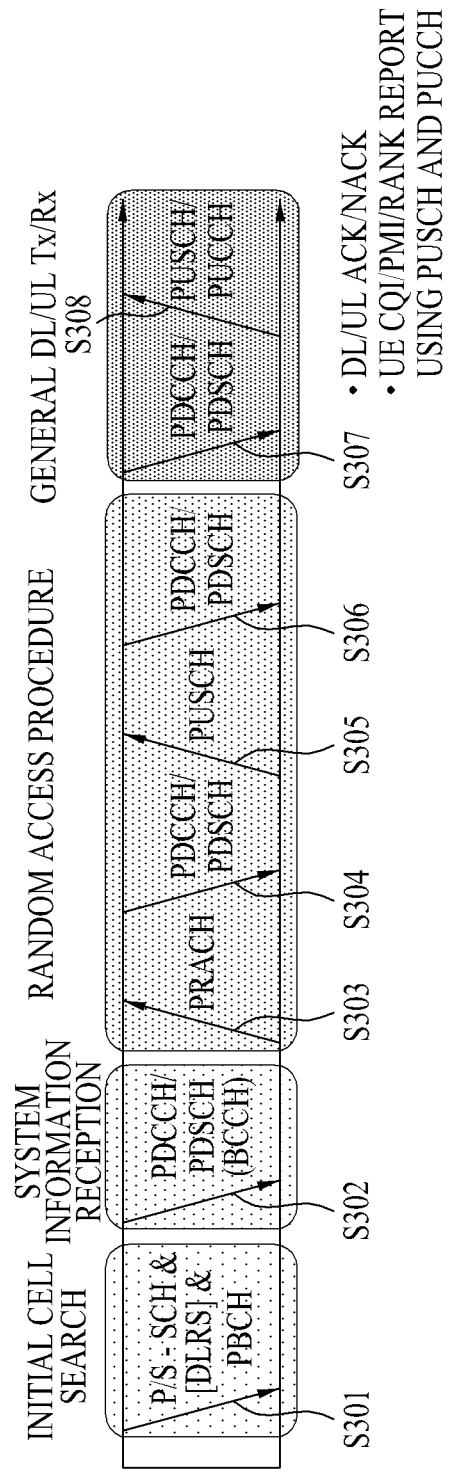
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
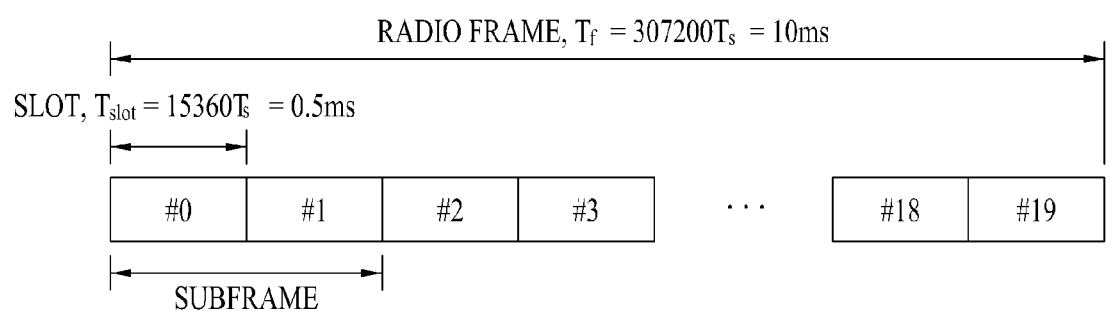
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
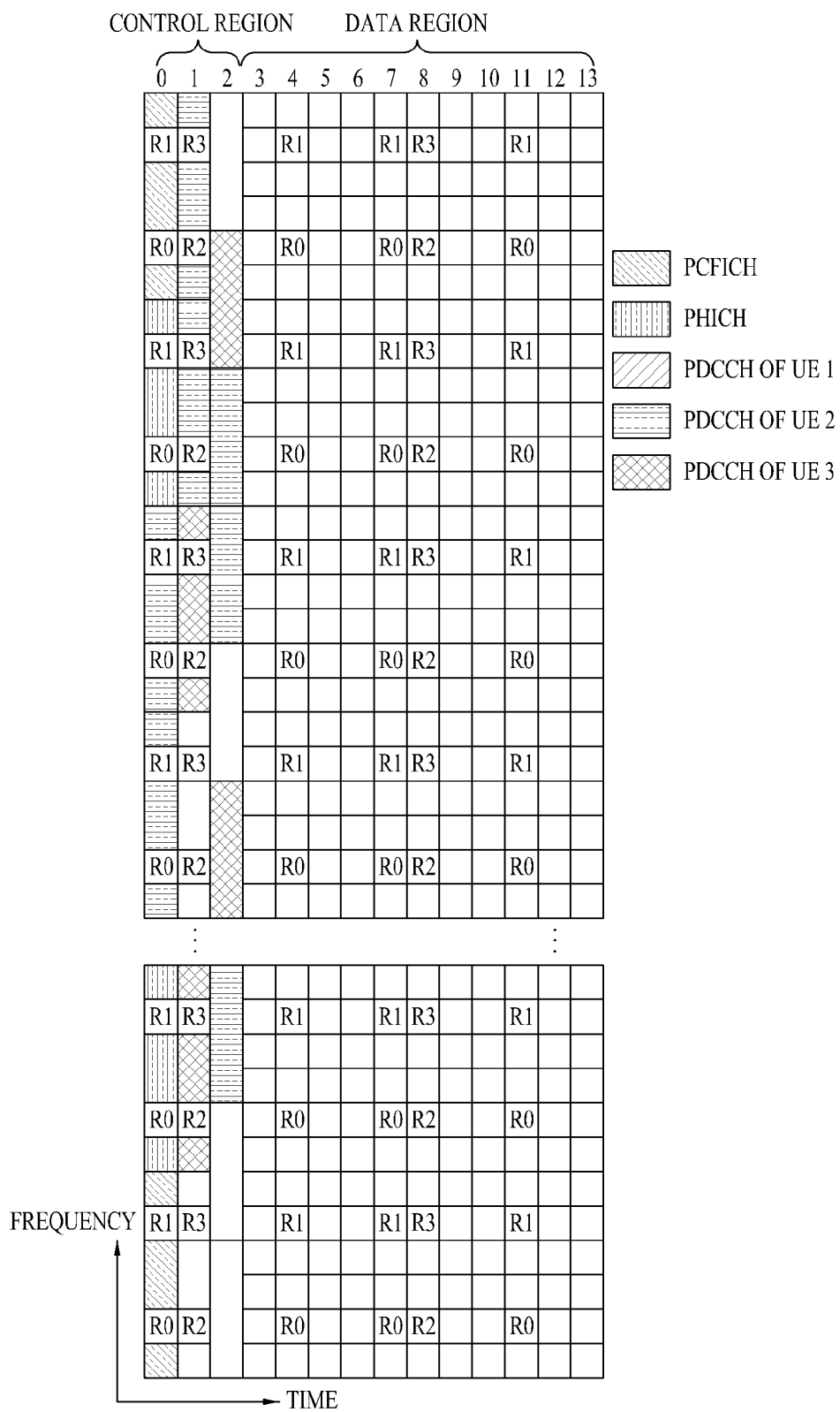
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission.

That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
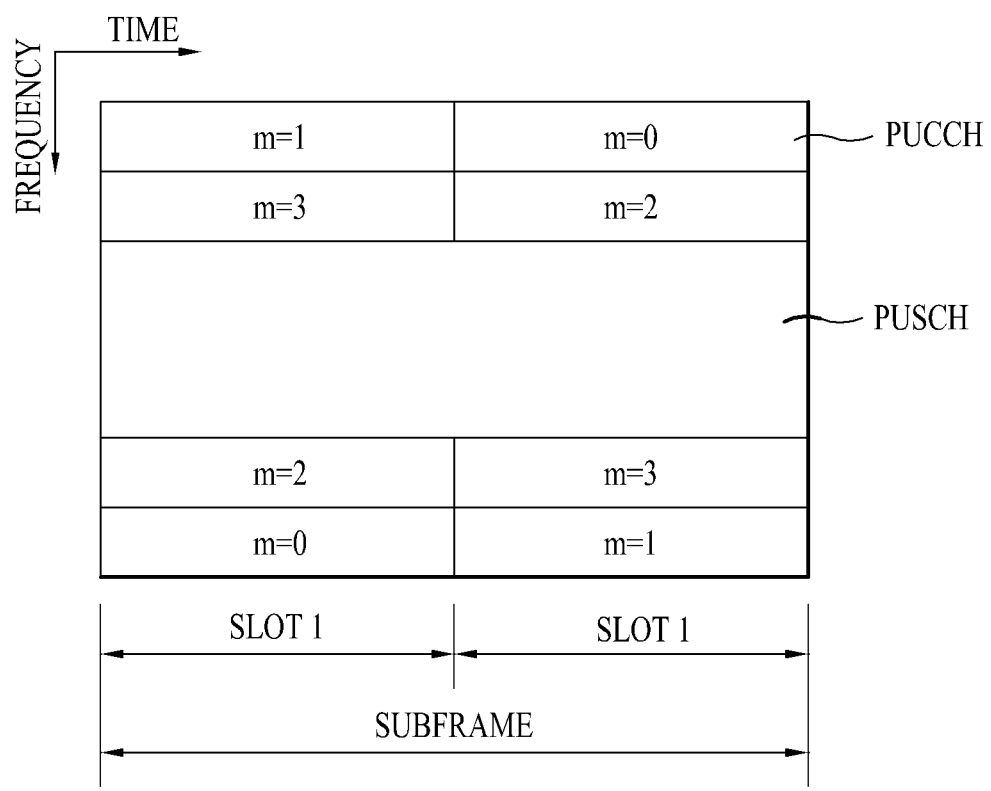
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
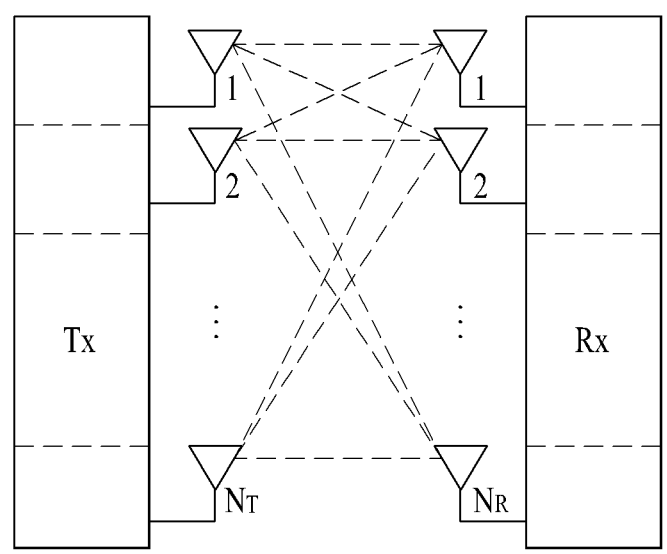
FIG. 7 is a diagram showing the configuration of a general multiple input multiple output (MIMO) system.

The configuration of the general multi-antenna (MIMO) communication system is shown in FIG. 7. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \quad \text{Equation 1}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}] \quad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \quad \text{Equation 3}$$

In addition, $\hat{s}$ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{Equation 6}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{Equation 7}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a coordinated MIMO-based Joint Processing (JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from eNBs, each of which implements a CoMP transmission scheme, and combine the signals received from the eNBs so as to improve reception performance (Joint Transmission (JT)). In addition, a method of transmitting data from one of eNBs, each of which performs a CoMP transmission scheme, to a UE at a specific time may be considered (Dynamic Point Selection (DPS)). In the CoMP-CS/CB scheme, a UE may instantaneously receive data from one eNB, that is, a serving eNB, through beamforming.

In case of uplink, in the CoMP-JP scheme, eNBs may simultaneously receive a PUSCH signal from a UE (Joint Reception (JR)). In the CoMP-CS/CB scheme, only one eNB receives a PUSCH. At this time, a determination as to whether a CoMP/CS-CB scheme is used is made by coordinated cells (or eNBs).

Hereinafter, a reference signal will be described in greater detail.

In general, for channel measurement, a reference signal known to a transmitter and a receiver is transmitted from the transmitter to the receiver along with data. Such a reference signal indicates a modulation scheme as well as channel measurement to enable a demodulation process. The reference signal is divided into a dedicated reference signal (DRS) for a base station and a specific UE, that is, a UE-specific reference signal, and a common reference signal or cell-specific reference signal (CRS) for all UEs in a cell. The CRS includes a reference signal used when a UE measures and reports CQI/PMI/RI to a base station and is also referred to as a channel state information (CSI)-RS.

Figure 8:
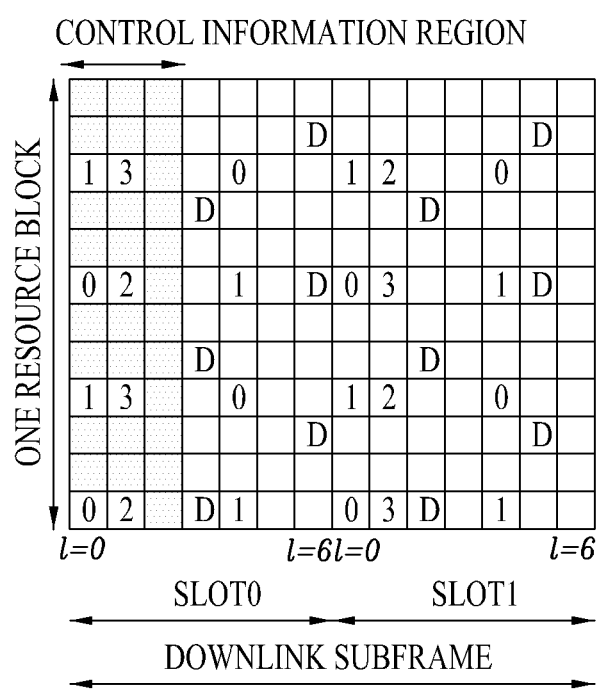
FIGS. 8 and 9 are diagrams the structure of a downlink reference signal in an LTE system supporting downlink transmission using four antennas.
Figure 9:
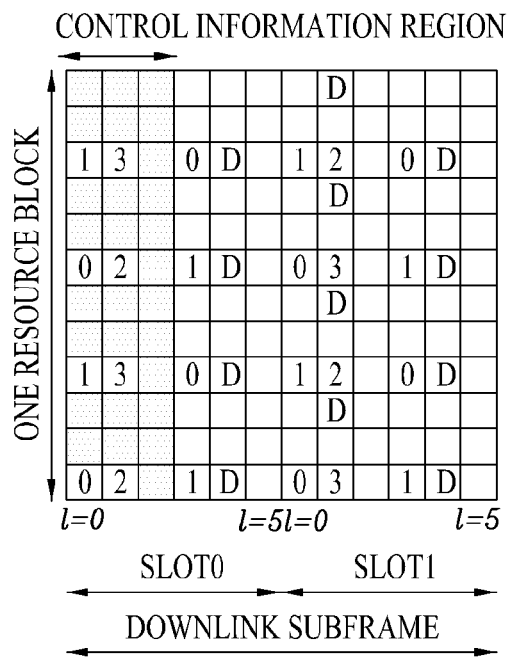

FIGS. 8 and 9 are diagrams showing the structure of a downlink reference signal in an LTE system supporting downlink transmission using four antennas. In particular, FIG. 8 shows a normal cyclic prefix (CP) and FIG. 9 shows an extended CP.

Referring to FIGS. 8 and 9, numerals 0 to 3 in grids mean CRSs transmitted for channel measurement and data demodulation and the CRSs may be transmitted to the UE not only in a data information region but also in a control information region.

In addition, "D" in a grid means a downlink demodulation-RS (DM-RS) which is a UE-specific RS and the DM-RS supports single antenna port transmission via a data region, that is, a physical downlink shared channel (PDSCH). The UE receives information indicating presence/absence of a DM-RS, which is a UE-specific RS, via a higher layer. FIGS. 8 and 9 show DM-RSs corresponding to antenna port 5. In the 3GPP standard 36.211, DM-RSs for antenna ports 7 to 14, that is, a total of eight antenna ports, are also defined.

Figure 10:
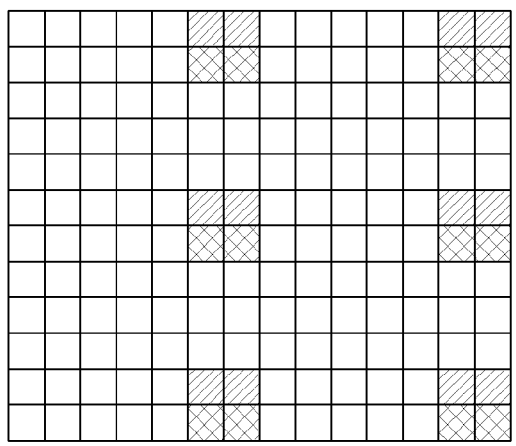
FIG. 10 is a diagram showing a downlink DM-RS assignment example defined in the current 3GPP standard.

FIG. 10 is a diagram showing a downlink DM-RS allocation example defined in the current 3GPP standard.

Referring to FIG. 10, DM-RSs corresponding to antenna ports {7, 8, 11, 13} are mapped to DM-RS group 1 using a sequence per antenna port and DM-RSs corresponding to antenna ports {9, 10, 12, 14} are mapped to DM-RS group 2 using a sequence per antenna port.

The above-described CSI-RS is proposed for the purpose of channel measurement of a PDSCH, separately from a CRS. Unlike the CRS, the CSI-RS may be defined as a maximum of 32 different resource configurations in order to reduce inter-cell interference (ICI) in a multi-cell environment.

CSI-RS (resource) configurations differ according to the number of antenna ports and CSI-RSs defined as maximally different CSI-RS configurations are configured to be transmitted between neighbor cells. Unlike the CRS, the CSI-RS supports a maximum of eight antenna ports. In the 3GPP standard, antenna ports 15 to 22, that is, a total of eight antenna ports, are allocated as antenna ports for CSI-RS. Tables 1 and 2 below show CSI-RS configurations defined in the 3GPP standard. In particular, Table 1 shows a normal CP and Table 2 shows an extended CP.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 11:
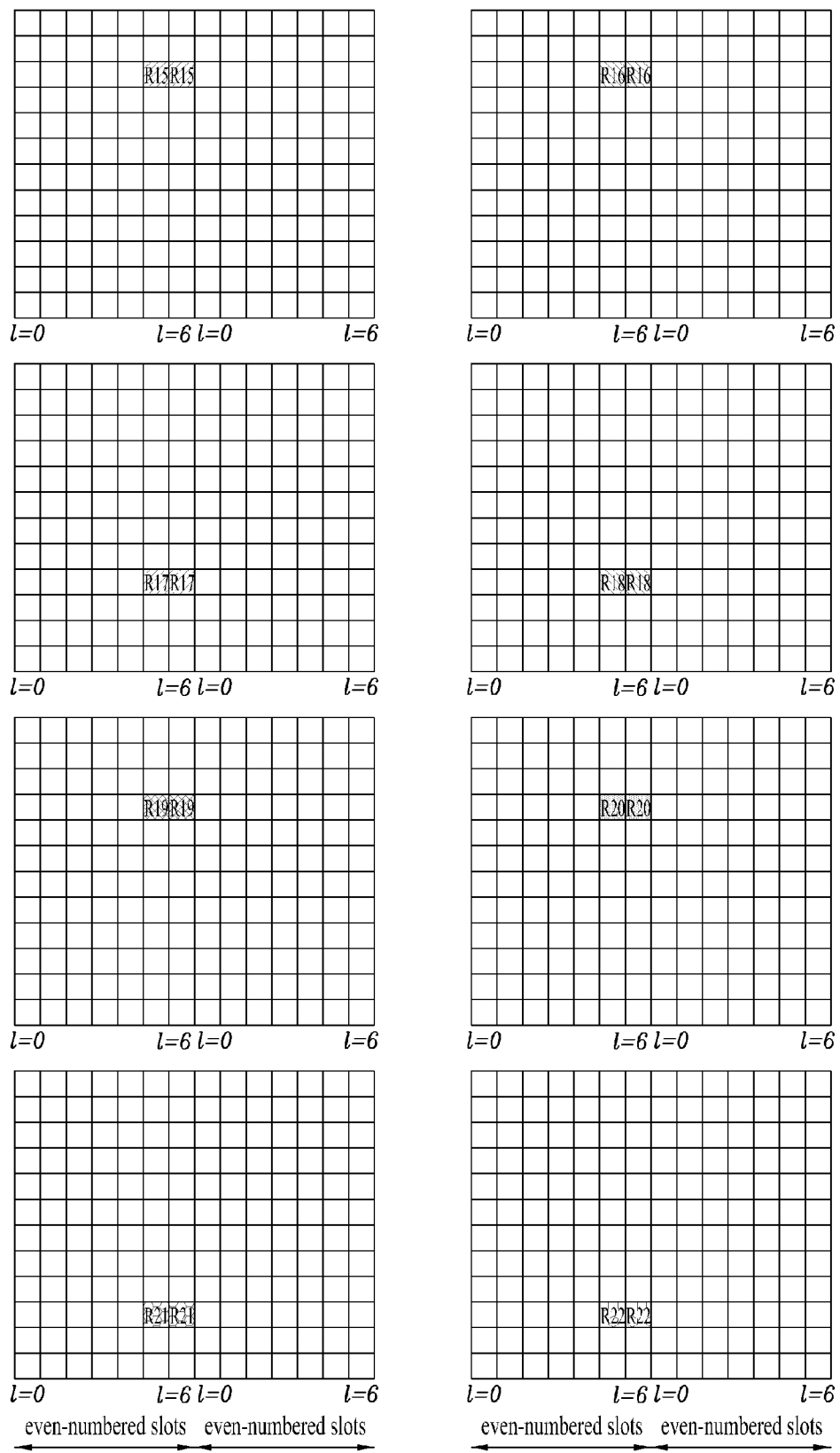
FIG. 11 is a diagram showing CSI-RS configuration #0 in case of a normal cyclic prefix (CP) among downlink CSI-RS configurations defined in the current 3GPP standard.

In Tables 1 and 2, (k', l') denote an RE index, k' denotes a subcarrier index and l' denotes an OFDM symbol index. FIG. 11 shows CSI-RS configuration #0 in a normal CP among CSI-RS configurations defined in the current 3GPP standard.

In addition, a CSI-RS subframe configuration may be defined and includes periodicity $T_{CSI-RS}$ expressed in subframe units and a subframe offset $\Delta_{CSI-RS}$ Table 3 below shows a CSI-RS subframe configuration defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Currently, information on a zero-power (ZP) CSI-RS is transmitted in a state of being included in a CSI-RS-Config-r10 message via an RRC layer signal as shown in Table below. In particular, a ZP CSI-RS resource configuration includes zeroTxPowerSubframeConfig-r10 and a 16-bit bitmap zeroTxPowerResourceConfigList-r10. zeroTxPowerSubframeConfig-r10 indicates transmission periodicity of a ZP CSI-RS and a subframe offset via a value $I_{CSI-RS}$ corresponding to Table 3. zeroTxPowerResourceConfigList-r10 indicates a ZP CSI-RS configuration and each element of the bitmap indicates configurations included in a column in which the number of CSI-RS antenna ports is 4 in Table 1 or 2. That is, according to the current 3GPP standard, the ZP CSI-RS is defined only when the number of CSI-RS antenna ports is 4.

TABLE 4

```
-- ASN1START
CSI-RS-Config-r10 ::=      SEQUENCE {
    csi-RS-r10                              CHOICE {
    ...
    }
    zeroTxPowerCSI-RS-r10       CHOICE {
        release                             NULL,
        setup                               SEQUENCE {
            zeroTxPowerResourceConfigList-r10   BIT STRING (SIZE (16)).
            zeroTxPowerSubframeConfig-r10       INTEGER (0..154)
        }
    }
}
-- ASN1STOP
```

Operation for calculating CQI via interference measurement will now be described. For reference, according to the current 3GPP standard, a CQI index, a modulation order corresponding thereto, a coding rate, etc. are shown in Table 5 below.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The UE needs to calculate an SINR as a factor necessary to calculate CQI. In this case, receive power measurement (S-measure) of a desired signal may be performed using an RS such as an NZP CSI-RS and power of an interference signal obtained by removing the desired signal from the received signal is measured for interference power measurement (I-measure or interference measurement (IM)).

Subframe sets $C_{CSI,0}$ and $C_{CSI,1}$ for CSI measurement may be configured via higher layer signaling and subframes corresponding to the subframe sets are included in one set without overlapping with each other. In this case, the UE may perform S-measure via an RS such as a CSI-RS without special subframe restriction but should individually perform I-measure with respect to $C_{CSI,0}$ and $C_{CSI,1}$ to calculate two different CSI for $C_{CSI,0}$ and $C_{CSI,1}$.

First Embodiment

In the present invention, in a ZP CSI-RS configuration, ZP CSI-RS resource configuration information including specific subframe restriction information is signaled such that I-measure is performed with respect to a subframe index set expressed by a bitmap or a specific subframe set. Of course, information on an RE location of a ZP CSI-RS for I-measure may be explicitly indicated using Tables 1 and 2 above. This will be described in detail.

First, in a ZP CSI-RS resource configuration, RE information (hereinafter, referred to as interference measurement resource element (IMRE) information) of a ZP CSI-RS for I-measure and RE location information (hereinafter, referred to as muting RE) of a ZP CSI-RS used for PDSCH rate matching without performing I-measure are separately indicated. Here, the ZP CSI-RS for I-measure and the ZP CSI-RS for PDSCH rate matching may have separate subframe periodicity and subframe offset information.

The IMRE information may include periodicity of a subframe in which the ZP CSI-RS for I-measure is transmitted, subframe offset information (or subframe index bitmap information, etc.), location information of the ZP CSI-RS for I-measure and information on the number of corresponding antenna ports.

As a method for indicating periodicity of the subframe in which the ZP CSI-RS for I-measure is transmitted and the subframe offset information (or subframe index bitmap information, etc.), as shown in Table 3 above, a method for indicating periodicity of the subframe in which the ZP CSI-RS for I-measure is transmitted and the subframe offset information via a value $I_{CSI-RS}$ may be used. In addition, a method for signaling transmission periodicity $T_{CSI-RS}^{IMRE}$ of the IMRE in the form of a multiple of subframe periodicity $T_{CSI-RS}$ corresponding to a ZP CSI-RS for muting while equally using a subframe offset $\Delta_{CSI-RS}$ corresponding to the ZP CSI-RS for muting to configure a transmission time of the ZP CSI-RS for I-measure in the form of a subset of muting RE transmission times may be used. For example, the ZP CSI-RS for muting and the ZP CSI-RS for I-measure share the same specific subframe offset $\Delta_{CSI-RS}$ and subframe periodicity of the ZP CSI-RS for muting may indicate an existing parameter value $T_{CSI-RS}$ (e.g., $T_{CSI-RS}=0$) and subframe periodicity of the ZP CSI-RS for I-measure may indicate a new $T_{CSI-RS}^{IMRE}$ (e.g., $T_{CSI-RS}^{IMRE}=10$, $T_{CSI-RS}^{IMRE}=20$, $T_{CSI-RS}^{IMRE}=40$ or $T_{CSI-RS}^{IMRE}=80$, etc.).

At this time, a subframe including a muting RE, that is, a ZP CSI-RS for muting, may be set to satisfy Equation 8 below and a subframe including an IMRE, that is, a ZP CSI-RS for I-measure, may be set to satisfy Equation 9 below.

$$(10n_f+\lfloor n_s/2 \rfloor-\Delta_{CSI-RS}) \mod T_{CSI-RS}= \qquad \text{Equation 8}$$

$$(10n_f+\lfloor n_s/2 \rfloor-\Delta_{CSI-RS}) \mod T_{CSI-RS}^{IMRE}=0 \qquad \text{Equation 9}$$

Alternatively, a method for indicating a subframe offset $\Delta_{CSI-RS}^{IMRE}$ for transmission of a ZP CSI-RS for I-measure and restricting $\Delta_{CSI-RS}^{IMRE}$ to a multiple of subframe periodicity $T_{CSI-RS}$ corresponding to a ZP CSI-RS for muting is applicable. At this time, a method for indicating the transmission periodicity $T_{CSI-RS}^{IMRE}$ of the ZP CSI-RS for I-measure in the form of a multiple of the subframe periodicity $T_{CSI-RS}^{IMRE}$ corresponding to the ZP CSI-RS for muting and configuring a transmission time of the ZP CSI-RS for I-measure in the form of a subset of transmission times of the ZP CSI-RS is possible. At this time, a subframe including a muting RE, that is, a ZP CSI-RS for muting, may be set to satisfy Equation 8 above and a subframe including an IMRE, that is, a ZP CSI-RS for I-measure, may be set to satisfy Equation 10 below.

$$(10n_f+\lfloor n_s/2 \rfloor-\Delta_{CSI-RS}-dT_{CSI-RS}) \mod (NT_{CSI-RS})=0 \qquad \text{Equation 10}$$

where, the transmission periodicity $T_{CSI-RS}^{IMRE}$ of the ZP CSI-RS for I-measure may be set to $N \cdot T_{CSI-RS}$ (N being a positive integer). Alternatively, the value N may be selected from among specific values. For example, N may be restricted to one of 1, 2, 4, 8 and 16 and $T_{CSI-RS}^{IMRE}$ may be set as one of the values $T_{CSI-RS}$ shown in Table 3 above.

In addition, the subframe offset $T_{CSI-RS}^{IMRE}$ of the ZP CSI-RS for I-measure may be set to $d \cdot T_{CSI-RS}$ (d is 0, 1, ..., N−1). For example, if $T_{CSI-RS}=10$ and $\Delta_{CSI-RS}=0$, for the ZP CSI-RS for I-measure, $T_{CSI-RS}^{IMRE}=4 \cdot T_{CSI-RS}=40$ and $\Delta_{CSI-RS}^{IMRE}=2 \cdot T_{CSI-RS}=20$ are set by applying N=4 and N=2 and the transmission time thereof may be defined.

In addition to the above-described methods, other modifications of a method for configuring a transmission time of a ZP CSI-RS for I-measure in the form of a subset of transmission times of a ZP CSI-RS for muting may be within the spirit of the present invention.

Although the method for periodically defining the transmission time of the ZP CSI-RS for I-measure has been described, a method for aperiodically defining a transmission time of a ZP CSI-RS for I-measure will now be described.

First, a method for explicitly signaling a transmission time of a ZP CSI-RS for I-measure in the form of a subframe index bitmap may be considered.

Figure 12:
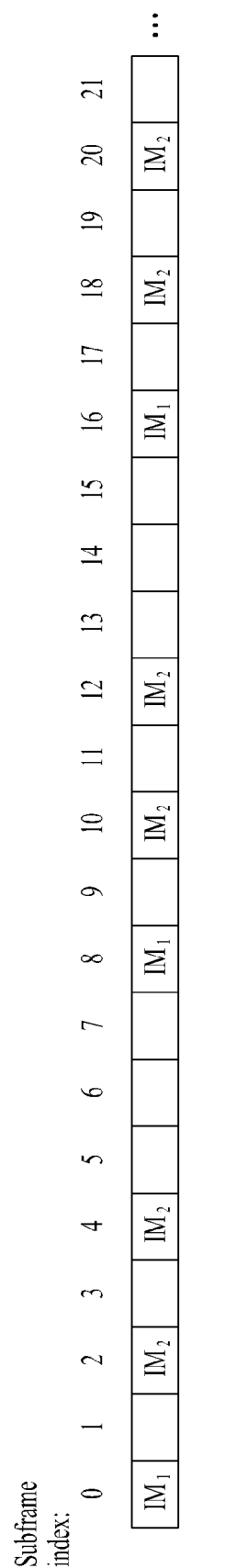
FIG. 12 is a diagram showing an example of a transmission time of a ZP CSI-RS for I-measure according to a first embodiment of the present invention.

FIG. 12 is a diagram showing an example of a transmission time of a ZP CSI-RS for I-measure according to a first embodiment of the present invention. In FIG. 12, ZP CSI-RS configuration #1 for I-measure and ZP CSI-RS configuration #2 for I-measure are shown and represented by $IM_1$ and $IM_2$, respectively.

Referring to FIG. 12, if it is assumed that the size L of the subframe index bitmap is 40 bits, ZP CRI-RS configuration #1 for I-measure is expressed by [1 0 0 0 0 0 0 0 1 0 0 0 0 0 0 0 1 0 0 0 0 0 0 0 1 0 0 0 0 0 0 0 1 0 0 0 0 0 0 0] and ZP CSI-RS configuration #2 for I-measure is expressed by [0 0 1 0 1 0 0 0 0 0 1 0 1 0 0 0 0 1 0 1 0 0 0 0 0 1 0 1 0 0 0 0 0 1 0 1 0 0 0]. Of course, the value L is not limited to 40 bits and may be changed to 80 bits.

If the bit denoted by 1 rarely appears in the subframe index bitmap, a bitmap expression method may cause unnecessary overhead. Therefore, a subframe satisfying the condition of Equation 8 above is primarily indicated using the periodicity $T_{CSI-RS}$ and the subframe offset $\Delta_{CSI-RS}$ via the value $I_{CSI-RS}$ of Table 3 above and a L-bit bitmap is signaled to define the L-bit bitmap such that a spacing between bits becomes $T_{CSI-RS}$ subframes from a time satisfying Equation 11 below as an additional condition.

$$\{(10n_f + \lfloor n_s/2 \rfloor - \Delta_{CSI-RS}) \bmod (T_{CSI-RS}L)\} = 0 \quad \text{Equation 11}$$

If the same $IM_1$ and $IM_2$ as FIG. 12 are expressed, for $IM_1$, that is, ZP CSI-RS configuration #1 for I-measure, $T_{CSI-RS}=2$, $\Delta_{CSI-RS}=0$ and L=4 and the bitmap may be expressed by [1 0 0 0]. In addition, for $IM_2$, that is, ZP CSI-RS configuration #2 for I-measure, $T_{CSI-RS}=2$, $\Delta_{CSI-RS}=0$ and L=4 and the bitmap may be expressed by [0 1 1 0]. Thus, the bitmap size can be significantly reduced.

The above description is only an example describing the spirit of the present invention and three or more ZP CSI-RSs for I-measure may be configured. Even in this case, similarly, as resource configuration information of the ZP CSI-RSs for I-measure, different subframe periodicity and subframe offset information (or different subframe index bitmap information, etc.), RE location information and information on the number of antenna ports corresponding thereto are included and such information may be individually delivered.

The method for exclusively configuring the resources for the plurality of ZP CSI-RSs for I-measure may be replaced with a method for indicating subframe restriction of I-measure via information on a CSI subframe sets $C_{CSI,0}$, $C_{CSI,1}$, ... or is applicable in the form of an intersection between two information.

Linkage information indicating that the plurality of ZP CSI-RSs for I-measure is linked to the CSI subframe sets $C_{CSI,0}$, $C_{CSI,1}$, ... in one-to-one correspondence should also be delivered via RRC signaling in advance. In this case, as shown in Table 3, by indicating the periodicity and the subframe offset via the value $I_{CSI-RS}$ only, the ZP CSI-RS for I-measure may be transmitted only in a subframe corresponding to subframe information indicated in CSI subframe sets $C_{CSI,0}$, $C_{CSI,1}$, ....

In addition, the existing information on the CSI subframe sets $C_{CSI,0}$, $C_{CSI,1}$, may be used for aperiodic CSI feedback triggering. That is, since a subframe which is not configured so as not to transmit the ZP CSI-RS for I-measure may be present, if aperiodic CSI feedback is triggered in such a subframe, the ZP CSI-RS for I-measure, interference power of which is used to calculate CQI, may not be confirmed.

Accordingly, according to linkage information indicating that the plurality of ZP CSI-RSs for I-measure is linked to the CSI subframe sets $C_{CSI,0}$, $C_{CSI,1}$, ... in one-to-one correspondence, which ZP CSI-RS for I-measure is used to calculate the CQI may be implicitly determined depending on in which of the CSI subframe sets $C_{CSI,0}$, $C_{CSI,1}$, ... aperiodic CSI feedback is triggered.

The periodicity of the subframe, in which the ZP CSI-RSs for I-measure are transmitted, and offset information always apply to the ZP CSI-RSs for I-measure and a final subframe capable of performing I-measure per ZP CSI-RS for I-measure may be configured to be specified by an L-bit subframe index bitmap configured per ZP CSI-RS for I-measure.

Figure 13:
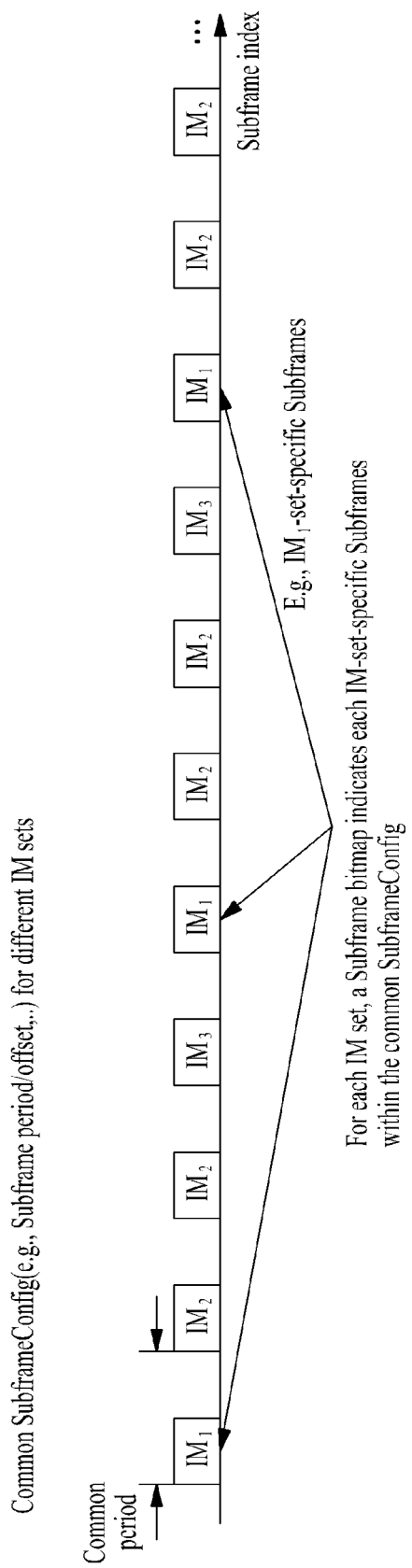
FIG. 13 is a diagram showing another example of a transmission time of a ZP CSI-RS for I-measure according to a first embodiment of the present invention.

FIG. 13 is a diagram showing another example of a transmission time of a ZP CSI-RS for I-measure according to a first embodiment of the present invention. Three ZP CSI-RSs for I-measure are present, common subframe configuration information is signaled and an L-bit subframe index bitmap information is further signaled per ZP CSI-RS for I-measure.

Referring to FIG. 13, as the common subframe configuration information, periodicity is set to 2 subframes, an offset is set to 0 and a bitmap size L is set to 40 bits. In this case, bitmap information of ZP CSI-RS #1 (that is, $IM_1$) for I-measure may be [1 0 0 0 0 0 0 0 1 0 0 0 0 0 0 0 1 0 0 0 0 0 0 0 1 0 0 0 0 0 0 0 1 0 0 0 0 0 0 0]. Further, bitmap information of ZP CSI-RS #2 (that is, $IM_2$) for I-measure may be [0 0 1 0 1 0 0 0 0 1 0 1 0 0 0 0 0 1 0 1 0 0 0 0 0 1 0 1 0 0 0 0 0 1 0 1 0 0 0]. Finally, bitmap information of ZP CSI-RS #3 (that is, $IM_3$) for I-measure may be [0 0 0 0 0 0 1 0 0 0 0 0 0 0 1 0 0 0 0 0 0 0 1 0 0 0 0 1 0 0 0 0 0 0 0 1 0].

Hereinafter, RRC signaling for implementing the above-described embodiments will be described.

First, in Table 6 below, resource configuration information of a ZP CSI-RS for I-measure is defined separately from zeroTxPowerCSI-RS-r11 which is resource configuration information of a ZP CSI-RS for muting. In particular, although zeroTxPowerCSI-RS-r11 which is resource configuration information of the ZP CSI-RS for muting is expressed by 16-bit zeroTxPowerResourceConfigList-r11 such that the number of antenna ports is restricted to 4 as in the current standard, two antenna ports may be used or the number of antenna ports may be directly specified using Table 1 or 2.

Further, in the resource configuration information of the ZP CSI-RS for I-measure, the number of antenna ports may be set to one of 2, 4 and 8, a specific RE location is specified using zeroTxPowerResourceConfig-r11, and a method for indicating periodicity of a subframe, in which a ZP CSI-RS for I-measure is present, and a subframe offset via zeroTxPowerSubframeConfig-r11 is specified using Table 3.

TABLE 6

```
-- ASN1START
CSI-RS-Config-r11 ::=    SEQUENCE {
  csi-RS-r11                              CHOICE {
  ...
  }
  zeroTxPowerCSI-RS-r11   CHOICE {
    release                               NULL,
    setup                                 SEQUENCE {
      zeroTxPowerResourceConfigList-      BIT STRING (SIZE (16)),
      r11
      zeroTxPowerSubframeConfig-r11       INTEGER (0. .154)
(IM sets)
{
      zeroTxPowerAntennaPortsCount-       ENUMERATED
      r11                                 {an2, an4, an8},
      zeroTxPowerResourceConfig-r11       INTEGER (0. .31),
      zeroTxPowerSubframeConfig-r11       INTEGER (0. .154),
}
{
      zeroTxPowerAntennaPortsCount-       ENUMERATED
      r11                                 {an2, an4, an8},
      zeroTxPowerResourceConfig-r11       INTEGER (0. .31),
      zeroTxPowerSubframeConfig-r11       INTEGER (0. .154),
}
...
}
}
}
-- ASN1STOP
```

Table 7 below is basically equal to Table 6 above but shows a method for delivering subframe configuration information of a ZP CSI-RS for I-measure using an L-bit bitmap via zeroTxPowerSubframeConfigList-r11.

TABLE 7

```
-- ASN1START
CSI-RS-Config-r11 ::=    SEQUENCE {
  csi-RS-r11                              CHOICE {
  ...
  }
  zeroTxPowerCSI-RS-r11   CHOICE {
    release                               NULL,
    setup                                 SEQUENCE {
      zeroTxPowerResourceConfigList-      BIT STRING (SIZE (16)),
      r11
      zeroTxPowerSubframeConfig-r11       INTEGER (0. .154)
(IM sets)
{
      zeroTxPowerAntennaPortsCount-r11    ENUMERATED
                                          {an2, an4, an8},
      zeroTxPowerResourceConfig-r11       INTEGER (0. .31),
      zeroTxPowerSubframeConfigList-      BIT STRING (SIZE (L)),
      r11
}
{
      zeroTxPowerAntennaPortsCount-r11    ENUMERATED
                                          {an2, an4, an8},
      zeroTxPowerResourceConfig-r11       INTEGER (0. .31),
      zeroTxPowerSubframeConfigList-r11   BIT STRING (SIZE (L)),
}
...
}
}
}
-- ASN1STOP
```

In Table 7 above, a zeroTxPowerSubframeConfig-r11 message indicating the subframe periodicity and offset information of the ZP CSI-RS for muting may be commonly referred to by all ZP CSI-RSs for I-measure and a final subframe may be interpreted as being specified in an individually configured L-bit bitmap of the commonly referred subframes per ZP CSI-RS for I-measure.

Alternatively, as shown in Table 8 below, a separate IMREzeroTxPowerSubframeConfig-r11 message may be commonly referred to by all ZP CSI-RSs for I-measure and a final subframe may be interpreted as being specified in an individually configured L-bit bitmap of the commonly referred subframes per ZP CSI-RS for 1-measure.

TABLE 8

```
-- ASN1START
CSI-RS-Config-r11 ::=    SEQUENCE {
  csi-RS-r11                              CHOICE {
  ...
  }
  zeroTxPowerCSI-RS-r11   CHOICE {
    release                               NULL,
    setup                                 SEQUENCE {
      zeroTxPowerResourceConfigList-r11   BIT STRING (SIZE (16)),
      zeroTxPowerSubframeConfig-r11       INTEGER (0. .154)
(IM sets)
      IMREzeroTxPowerSubframeConfig-      INTEGER (0. .154)
      r11
{
      zeroTxPowerAntennaPortsCount-r11    ENUMERATED
                                          {an2, an4, an8},
      zeroTxPowerResourceConfig-r11       INTEGER (0. .31),
      zeroTxPowerSubframeConfigList-r11   BIT STRING (SIZE (L)),
}
{
      zeroTxPowerAntennaPortsCount-r11    ENUMERATED
                                          {an2, an4, an8},
      zeroTxPowerResourceConfig-r11       INTEGER (0. .31),
      zeroTxPowerSubframeConfigList-r11   BIT STRING (SIZE (L)),
}
...
}
}
}
-- ASN1STOP
```

In addition, in Table 9 below, zeroTxPowerAntennaPortsCount-r11 is not present, the range of a value zeroTxPowerResourceConfig-r11 is set to INTEGER (0 . . . 15), and the RE location of the ZP CSI-RS for I-measure specifies one of the locations of the ZP CSI-RSs for muting and, preferably, an element expressed by 1 in bitmap information indicating the location of the ZP CSI-RE for muting. That is, while a bitmap specifying the RE location of the existing ZP CSI-RS for muting is referred to, the RE location of the ZP CSI-RS for I-measure is implemented by selecting one of the bitmaps. As shown in Table 8, a method for referring to IMREzeroTxPowerSubframeConfig-r11 is also applicable to the subframe configuration.

TABLE 9

```
-- ASN1START
CSI-RS-Config-r11 ::=    SEQUENCE {
  csi-RS-r11                              CHOICE {
  ...
  }
  zeroTxPowerCSI-RS-r11   CHOICE {
    release                               NULL,
    setup                                 SEQUENCE {
      zeroTxPowerResourceConfigList-r11   BIT STRING (SIZE (16)),
      zeroTxPowerSubframeConfig-r11       INTEGER (0. .154)
(IM sets)
{
      zeroTxPowerResourceConfig-r11       INTEGER (0. .15),
      zeroTXPowerSubframeConfigList-r11   BIT STRING (SIZE (L)),
}
{
      zeroTxPowerResourceConfig-r11       INTEGER (0. .15),
      zeroTxPowerSubframeConfigList-r11   BIT STRING (SIZE (L)),
}
```

TABLE 9-continued

```
    ...
    }
  }
}
}
-- ASN1STOP
```

In Table 10 below, a subframe satisfying Equation 8 with the periodicity $T_{CSI-RS}$ and the subframe offset $\Delta_{CSI-RS}$ indicated by the value $I_{CSI-RS}$ is primarily indicated by zeroTx-PowerSubframeConfig-r11 and an L-bit bitmap is defined such that a spacing between bits becomes $T_{CSI-RS}$ subframes from a time satisfying Equation 11 below by zeroTxPower-SubframeConfigList-r11 which is the L-bit bitmap.

TABLE 10

```
-- ASN1START
CSI-RS-Config-r11 ::=    SEQUENCE {
  csi-RS-r11                         CHOICE {
  ...
  }
  zeroTxPowerCSI-RS-r11       CHOICE {
    release                           NULL,
    setup                             SEQUENCE {
      zeroTxPowerResourceConfigList-r11   BIT STRING (SIZE (16)),
      zeroTxPowerSubframeConfig-r11       INTEGER (0. .154)
(IM sets)
{
  zeroTxPowerAntennaPortConfig-r11    ENUMERATED
                                      {an2, an4, an8},
  zeroTXPowerResourceConfig-r11       INTEGER (0. .31),
  zeroTxPowerSubframeConfig-r11       INTEGER (0. .154),
  zeroTXPowerSubframeConfigList-r11   BIT STRING (SIZE (L)),
}
{
  zeroTxPowerAntennaPortsCount-r11    ENUMERATED
                                      {an2, an4, an8},
  zeroTXPowerResourceConfig-r11       INTEGER (0. .31),
  zeroTxPowerSubframeConfig-r11       INTEGER (0. .154),
  zeroTXPowerSubframeConfigList-r11   BIT STRING (SIZE (L)),
}
  ...
  }
}
}
-- ASN1STOP
```

In the above examples, the zeroTxPowerAntennaPorts-Count-r11 message configured per ZP CSI-RS for I-measure may not be included if the same number of antenna ports is set in ZP CSI-RSs for I-measure. This is because interference power measurement performance does not need to be changed by changing the number of antenna ports when a plurality of ZP CSI-RSs for I-measure is present.

L-bit pattern information is not restricted to a subframe pattern indication for interference measurement and may be delivered via RRC signaling. That is, the L-bit pattern information delivered via separate RRC signaling may be used for a subframe configuration of the ZP CSI-RS for I-measure.

If L-bit pattern information is delivered via separate RRC signaling, the cell does not use such bitmap information for interference measurement but a neighbor cell may use such bitmap information to indicate a subframe configuration of a ZP CSI-RS for muting in order to satisfy a desired interference measurement condition.

More specifically, the L-bit pattern information may be linked to a subframe indication of a specific ZP CSI-RS for I-measure only or a subframe indication for a ZP CSI-RS for muting only. The L-bit pattern information may be linked to both a subframe indication of a specific ZP CSI-RS for I-measure and a subframe indication for a ZP CSI-RS for muting.

The UE may perform I-measure with respect to the ZP CSI-RS for I-measure and may not perform I-measure with respect to the ZP CSI-RS for muting but perform rate matching with respect to ZP CSI-RS RE locations.

In addition, in a relationship between a CSI subframe set defined for resource-restrictive CSI measurement such as an almost blank subframe (ABS) and the L-bit pattern information, a method for linking HARQ periodicity to the value L is applicable. For example, in FDD, since the periodicity of the ABS is 40 ms, L may be set to 40. Alternatively, in TDD, L may be variously set to 60 ms or 70 ms according to UL/DL configuration. Even in this case, the value L may be linked to HARQ periodicity.

Second Embodiment

As described above, in the current 3GPP standard, a bitmap method is used for ZP CSI-RS configuration (for muting). Via this method, the UE receives a plurality of ZP CSI-RSs of 4 RE units having the same periodicity. If four REs are suitable for I-measure, for CSI measurement feedback, a method for specifying which ZP CSI-RS is used for I-measure on the bitmap is proposed.

For example, if the bitmap size of the ZP CSI-RS configuration of 4 RE units is 16 bits, one of the values of {0, 1, ..., 15} may be specified with respect to the ZP CSI-RS for I-measure to indicate that the location of the bitmap is a ZP CSI-RS having a size of 4 REs used for I-measure. For example, if a specific value 9 is received, it may be indicated that the ZP CSI-RS of 4 REs corresponding to a bit index 9 of the 16-bit bitmap is a ZP CSI-RS to be used for I-measure.

Further, a 1-bit indicator indicating that only two specific REs among four REs corresponding to the bit index 9 are used for I-measure may be additionally defined. Here, four REs may be divided by 2 REs on the frequency axis and the 1-bit indicator indicates 2 REs used for I-measure. For example, 2 REs, the subcarrier indices of which in the RB are small, are indicated if the 1-bit indicator is 0 and 2 REs, the subcarrier indices of which in the RB are large, are indicated if the 1-bit indicator is 1. Alternatively, 2 REs may be specified by locations of two antenna port CSI-RS configurations. This is merely exemplary and four REs may be divided by 2 REs located at OFDM symbol indices on the time axis among 4 REs or 2 REs among 4 REs may be indicated using other methods.

As another method for indicating two specific REs among the four REs, two specific REs may be indicated by indicating one of 0, 1, ... , and 19, which are CSI-RS configuration states, corresponding to the "Number of CSI-RSs configured: 1 or 2" column of Table 1 above, that is, the case in which the number of antenna ports is 1 or 2. In case of a TDD subframe, that is, frame structure type 2, one of 20, 21, ... , and 31 may be indicated. This is applicable to Table 2 of an extended CP.

If the ZP CSI-RS for I-measure is indicated in 8 RE units, eight specific REs may be indicated by indicating one of 0, 1, ... , and 4, which are CSI-RS configuration states, corresponding to the "Number of CSI-RSs configured: 8" column of Table 1 above, that is, the case in which the number of antenna ports is 8. In the case of frame structure type 2, one of 20, 21 and 22 may be indicated. Eight specific REs may be indicated even in Table 2 of an extended CP. When the ZP CSI-RS for I-measure is indicated in 8 RE units, 8 RE locations must be RE indications indicated in the ZP CSI-RS bitmap of 4 RE units.

As another method for indicating the ZP CSI-RS for I-measure in 4 RE units, similarly, four specific REs may be indicated by indicating one of 0, 1, ... , and 9, which are CSI-RS configuration states, corresponding to the "Number of CSI-RSs configured: 4" column of Table 1 above. In case of frame structure type 2, one of 20, 21, . . . , and 25 may be indicated. Four specific REs may be indicated even in Table 2 of an extended CP. When the ZP CSI-RS for I-measure is indicated in 4 RE units, 4 RE locations must be RE locations indicated in the ZP CSI-RS bitmap of 4 RE units.

In the above methods, if the locations of 2 RE units, 4 RE units or 8 RE units indicating the ZP CSI-RS for I-measure are not included in the bitmap defining the ZP CSI-RS of 4 RE units, the UE may regard this configuration as misconfiguration. That is, the UE may operate excluding the case in which the ZP CSI-RS configuration for I-measure may be regarded as misconfiguration.

As another method, a method for indicating which of the locations set to 1 on the bitmap defining the ZP CSI-RS of 4 RE units is used is applicable. For example, assume that a 16-bit bitmap such as [0 0 0 1 0 1 0 0 0 0 1 1 1 0 1 0] is received. That is, if bit indices 3, 5, 10, 11, 12 and 14 are set to 1, assume that the ZP CSI-RSs of four REs corresponding to the bit index locations are configured. At this time, as additional information, a value indicating which of the locations set to 1 on the 16-bit bitmap may be signaled as RE location information to be used for a specific ZP CSI-RS for I-measure. More specifically, the bit index 3 which is firstly set to 1 on the bitmap may be indicated if 0 is received as the location information of the ZP CSI-RS for I-measure, the bit index 5 which is secondly set to 1 on the bitmap may be indicated if 1 is received as the location information of the ZP CSI-RS for I-measure, and the bit index 11 which is fourthly set to 1 on the bitmap may be indicated if 3 is received as the location information of the ZP CSI-RS for I-measure. Accordingly, it may be indicated that the ZP CSI-RSs of 4 REs corresponding to a specific bit index are ZP CSI-RSs for I-measure.

Even in this case, 1-bit information indicating that only two specific REs among four REs are ZP CSI-RSs for I-measure may be added.

In addition, if (4*N) REs are necessary for I-measure, a method for indicating N ZP CSI-RSs of 4 RE units to be used for I-measure on the bitmap is applicable. That is, as described above, a 16-bit bitmap expressing ZP CSI-RSs of four REs is given in advance and N values indicating the bit index are assigned, thereby indicating N ZP CSI-RSs of 4 RE units to be used for I-measure. For example, if N=2 and bit indices 9 and 13 are specified, it may be indicated that, among bit indices {0, 1, . . . , 15} of the 16-bit bitmap, ZP CSI-RSs of 4 REs corresponding to the bit index 9 and ZP CSI-RSs of 4 REs corresponding to the bit index 13 are ZP CSI-RSs to be used for I-measure.

As another method, if a 16-bit bitmap expressing ZP CSI-RSs of 4 REs is given and (4*N) REs are necessary for I-measure, it is possible to indicate which of the locations set to 1 on the bitmap may be used. For example, if [0 0 0 1 0 1 0 0 0 0 1 1 1 0 1 0] is given as a bitmap, assume that N=2 and bit indices 0 and 3 are specified. In this case, 0 may mean the index 3 of the bitmap, which is firstly set to 1 and 3 may mean the index 11 of the bitmap, which is fourthly set to 1.

The above-described 4 RE units are used as bitmap information for convenience of description and the proposed methods are not limited to specific RE units. That is, if it is assumed that a plurality of ZP CSI-RSs of k RE units is configured using the bitmap method and ZP CSI-RSs of k REs are suitable for I-measure, which of the ZP CSI-RSs on the bitmap is used for I-measure may be specified. Similarly, the ZP CSI-RS for 1-measure may be signaled by indicating which of the locations set to 1 on the bitmap is used. If (k*N) REs are necessary for I-measure, N ZP CSI-RSs of k RE units to be used for I-measure on the bitmap are specified.

Figure 14:
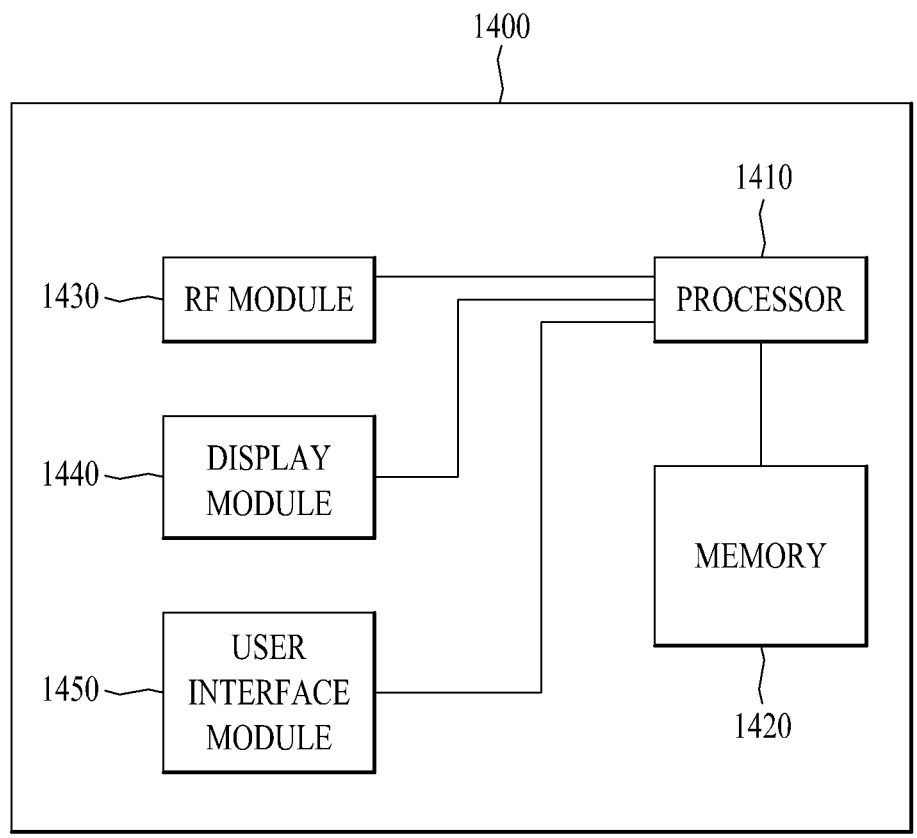
FIG. 14 is a block diagram of a communication apparatus according to one embodiment of the present invention.

FIG. 14 is a block diagram of a communication apparatus according to one embodiment of the present invention.

Referring to FIG. 14, a communication apparatus 1400 includes a processor 1410, a memory 1420, a Radio Frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with reference to the drawings. For a detailed description of the operation of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method and apparatus for measuring interference in a base station cooperative wireless communication system is applied to a 3GPP LTE system is described, the present invention is applicable to various wireless communication systems in addition to the 3GPP LTE system.

The invention claimed is:

1. A method for configuring resources of a reference signal for interference measurement at a user equipment (UE) in a wireless communication system, the method comprising:
   receiving first resource configuration information including bitmap information indicating a location of a resource element for a reference signal within one subframe and subframe information for reception of the reference signal;
   receiving second resource configuration information of the reference signal for interference measurement configured based on the first resource configuration information; and
   configuring the resources of the reference signal for interference measurement based on the second resource configuration information,
   wherein the second resource configuration information includes resource element information indicating locations of one or more resource elements and interference measurement subframe information indicating a subframe location for reception of the reference signal for interference measurement, and
   wherein a subframe indicated by the interference measurement subframe information is defined by a subset of subframes indicated by the subframe information included in the first resource configuration information.

2. The method according to claim 1, wherein the subframe information included in the first resource configuration information includes subframe periodicity and a subframe offset and the subframe measurement subframe information is a multiple of the subframe periodicity.

3. The method according to claim 1, wherein the subframe offset of the reference signal for interference measurement is equal to the subframe offset of the subframe information included in the resource configuration information.

4. The method according to claim 1, wherein the subframe information included in the first resource configuration information includes subframe periodicity and a subframe offset and the subframe measurement subframe information includes a subframe offset of the reference signal for interference measurement, which is expressed as a multiple of the subframe periodicity.

5. The method according to claim 1, wherein the location of a resource element indicated by the resource element information is included in locations of resource elements indicated by the bitmap information.

6. The method according to claim 1, wherein the reference signal is a zero-power channel state information reference signal (CSI-RS).

7. The method according to claim 1, wherein the zero-power CSI-RS is defined in four resource element units.

8. The method according to claim 7, wherein, if the reference signal for interference measurement is defined by eight resource elements, the resource element information includes information on two bit indices set to 1 in the bitmap information.

9. The method according to claim 7, wherein, if the reference signal for interference measurement is defined by two resource elements, the resource element information further includes information indicating two resource elements among four resource elements indicated by the bitmap information.

10. The method according to claim 6, wherein the zero-power CSI-RS is received from one or more neighbor cells.

11. A user equipment (UE) operating in a wireless communication system, the UE comprising:
   a processor; and
   a radio frequency (RF) module operatively coupled to the processor,
   the RF module configured to receive first resource configuration information including bitmap information indicating a location of a resource element for a reference signal within one subframe and subframe information for reception of the reference signal and to receive second resource configuration information of the reference signal for interference measurement configured based on the first resource configuration information,
   the processor configured to configure the resources of the reference signal for interference measurement based on the second resource configuration information,
   wherein the second resource configuration information includes resource element information indicating locations of one or more resource elements and interference measurement subframe information indicating a subframe location for reception of the reference signal for interference measurement, and
   wherein a subframe indicated by the interference measurement subframe information is defined by a subset of subframes indicated by the subframe information included in the first resource configuration information.

12. The UE according to claim 11, wherein the reference signal is a zero-power channel state information reference signal (CSI-RS).

13. The UE according to claim 12, wherein the zero-power CSI-RS is defined in four resource element units.

14. The UE according to claim 12, wherein the zero-power CSI-RS is received from one or more neighbor cells.

* * * * *